US 6,473,473 B1

(12) United States Patent
Piirainen

(10) Patent No.: US 6,473,473 B1
(45) Date of Patent: Oct. 29, 2002

(54) METHOD FOR ESTIMATING CONNECTION QUALITY, DIVERSITY COMBINATION METHOD, AND RECEIVER

(75) Inventor: Olli Piirainen, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/171,683

(22) PCT Filed: Apr. 22, 1997

(86) PCT No.: PCT/FI97/00245

§ 371 (c)(1),
(2), (4) Date: Oct. 22, 1998

(87) PCT Pub. No.: WO97/41702

PCT Pub. Date: Nov. 6, 1997

(30) Foreign Application Priority Data

Apr. 26, 1996 (FI) .................................................. 961796

(51) Int. Cl.[7] .......................... H04L 27/06; H03D 1/00; H03H 7/30; H03H 7/40
(52) U.S. Cl. ....................................... 375/343; 375/232
(58) Field of Search .................................. 375/343, 232

(56) References Cited

U.S. PATENT DOCUMENTS

| | | | | |
|---|---|---|---|---|
| 5,031,193 A | * | 7/1991 | Atkinson et al. | 375/231 |
| 5,199,047 A | * | 3/1993 | Koch | 375/231 |
| 5,271,042 A | * | 12/1993 | Borth et al. | 375/348 |
| 5,432,816 A | * | 7/1995 | Gozzo | 375/232 |
| 5,432,821 A | * | 7/1995 | Polydoros et al. | 375/340 |

FOREIGN PATENT DOCUMENTS

| | | |
|---|---|---|
| EP | 0 664 625 | 7/1995 |
| WO | WO 91/17607 | 11/1991 |

OTHER PUBLICATIONS

M. Barton and D.W. Tufts, A Suboptimum Linear Receiver Derived From SVD Based Channel Estimates, IEEE 1998, pp. 0831–0835.*

Vila, P., et al., 1995 International Conference on Acoustics Speech, and Signal Processing, conference Proceedings, "MMSE Antenna Diversity Equalization of a Jammed Frequency–Selective Fading Channel", abstract.

Lee, William C.Y., *Combining Technology*, "Mobile Communications Engineering", Chapter 10, pp. 291–336.

A copy of the International Search Report for PCT/FI97/00245.

* cited by examiner

*Primary Examiner*—Chi Pham
*Assistant Examiner*—Tony Al-Beshrawi
(74) *Attorney, Agent, or Firm*—Altera Law Group, LLC

(57) ABSTRACT

The invention relates to a method for estimating the quality of a connection and a diversity combination method in a digital radio system in which the signals transmitted are in burst form, the bursts comprising a training sequence; and to a receiver comprising a filter matched to the received signal. To effect simple estimation of the quality of the connection, the receiver comprises means for forming a result vector of at most the length of the training sequence from the symbols of the output signal of the matched filter and the corresponding symbols of the training sequence; means for computing a mean value and variance for the symbols of the result vector; and means for forming a quantity proportional to signal quality as a quotient of the squared mean value of the result vector and the variance of the result vector.

11 Claims, 2 Drawing Sheets

METHOD FOR ESTIMATING CONNECTION QUALITY, DIVERSITY COMBINATION METHOD, AND RECEIVER

FIELD OF THE INVENTION

The invention relates to a method for estimating the quality of a connection in a digital radio system in which the signals transmitted comprise bursts consisting of symbols and comprising a known training sequence, and in which method a received signal is processed by a matched filter.

BACKGROUND ART

In a cellular radio system, the quality of a connection between a base station and a subscriber terminal varies continuously. The variation is caused by interference on the radio path and attenuation of radio waves as a function of distance and time on a fading channel. The quality of a connection can be measured, for example, by monitoring the power received. Any variation in the connection quality can be partly compensated for by power adjustment.

In a digital cellular radio system, a more accurate method than power measurement is needed in order to estimate the quality of the connection. Previously known quality parameters are here, for example, Bit Error Rate BER and signal-to-noise ratio.

It is previously known to utilize Viterbi detection decisions in the estimation of a signal-to-noise ratio of a received signal. A base station or a subscriber terminal can function as a receiver. In previously known solutions, Viterbi detection is performed on a received burst as a whole before the signal-to-noise ratio is defined. Since a Viterbi algorithm, however, is often too demanding an operation for a digital signal processing program to perform in the processing time allowed by the receiver, separate Viterbi hardware has to be used for it. This is described in greater detail in 'A Viterbi Algorithm with Soft-decision Outputs and its Applications' by J. Hagenauer and P. Hoeher in IEEE GLOBECOM 1989, Dallas, Tex. November 1989, which is incorporated herein by reference.

In cellular radio systems, various diversity methods are used generally for improving the quality of a connection between a base station and a subscriber terminal under varying conditions. In diversity methods, information contained in a plural number of received signals that do not correlate with one another is preferably combined. In multipath reception, the most common diversity receivers combine the signals before or after the detection, and they comprise, for example, selective combination, maximal ratio combination, and equal gain combination. Multipath signals are usually detected by Viterbi detection, whereby they are combined after the detection. The diversity receivers and the above methods are described in greater detail in, for example, William C. Y. Lee, Mobile Communications Engineering, chapter 10, 'Combining technology', p. 291–336, Mc-Graw-Hill, U.S.A., 1982, which is incorporated herein by reference.

The preferred diversity combination method is maximal ratio combination, which is conducted before the detection, since a higher signal gain is then achieved. In the maximal ratio combination, the received signals are weighted and co-phased before the combination. The problem lies in finding the correct weighting coefficients.

CHARACTERISTICS OF THE INVENTION

The object of the present invention is to implement a method by which it is possible to estimate the quality of a connection by a quantity proportional to the signal-to-noise ratio directly from the received signal without the use of Viterbi detection. Another object is to implement a method for computing weighting coefficients and thereby to enable signal combination before detection, when diversity receivers are used.

The above is achieved by a method according to the introduction, which is characterized in that a result vector of at most the length of the training sequence is formed from the symbols of the output signal of the matched filter and the corresponding symbols of the known training sequence, and that a mean value and variance are computed for the symbols of the result vector, and that a quantity proportional to signal quality is formed as a quotient of the squared mean value of the result vector and the variance of the result vector.

The invention also relates to a diversity combination method according to claim 2 and a receiver according to claim 5.

Several advantages are achieved by the solution provided by the invention. By the method of the invention, the signal quality can be estimated directly from the received signal without conducting Viterbi detection, or by carrying out the method of the invention before Viterbi detection, utilizing the previously known training sequence contained in the burst. The invention comprises two main steps: forming of a result vector by a matched filter and a training sequence, and forming of a quantity proportional to signal quality by the result vector. The quantity proportional to signal quality stands for the signal-to-noise ratio.

When the use of a Viterbi algorithm is avoided, memory capacity is saved and less time is needed for computation. The quantity proportional to signal quality can be used in the estimation of the state of the channel, in methods for estimating bad frames, and particularly in the computation of weighting coefficients in diversity combination when multipath signals are combined before detection.

DESCRIPTION OF THE FIGURES

In the following the invention will be described in greater detail with reference to the examples illustrated in the attached drawings, in which.

DESCRIPTION OF PREFERRED EMBODIMENTS

Figure 1:
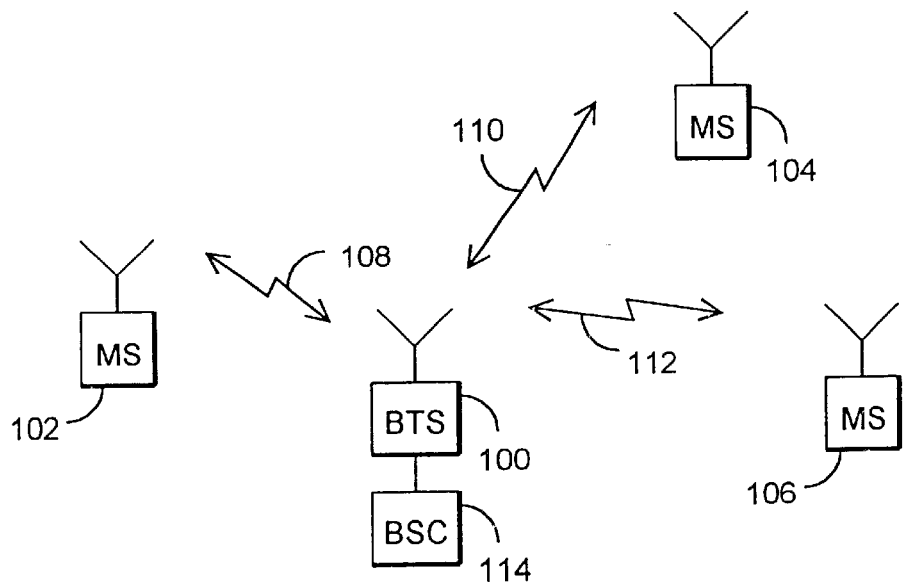
FIG. 1 illustrates a cellular radio system in which a method of the invention can be applied.

The method and receiver according to the invention can be applied in any digital radio system whatsoever in which the signals transmitted comprise bursts consisting of symbols and comprising a known training sequence. The essential parts of a structure of a typical cellular radio system are described, by way of an example, in FIG. 1. The system comprises a base station 100 and a plural number of usually mobile subscriber terminals 102–106 having a bidirectional connection 108–112 with the base station 100. The base station 100 passes the connections of the subscriber terminals 102–106 to a base station controller 114, which forwards them to the other parts of the system and to the fixed network. The base station controller 114 controls the operation of one or more base stations 100.

Figure 2:
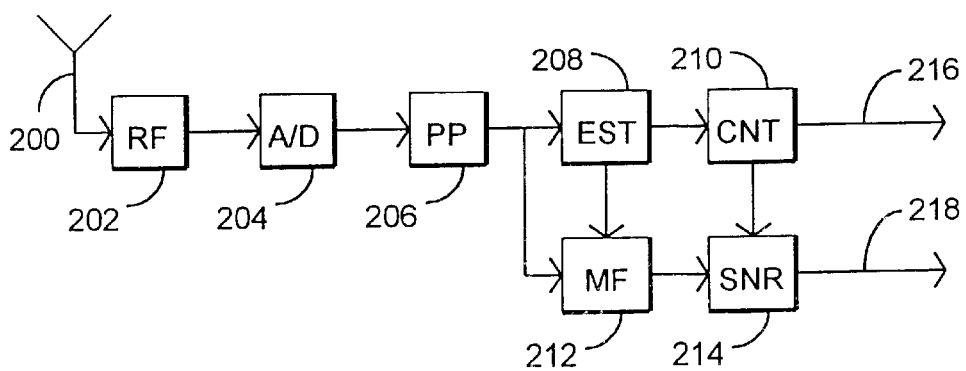
FIG. 2 illustrates the essential parts of an exemplary structure of a receiver according to the invention.

In the following we shall discuss in greater detail the structure of a receiver of a radio system according to the invention, the essential parts of the structure being illustrated by the block diagram of FIG. 2. In the invention, both a base station and a subscriber terminal can function as receivers. The receiver comprises an antenna 200 receiving a signal, which is then supplied to radio frequency parts 202, in which it is converted to an intermediate frequency. From the radio frequency parts the signal is supplied to converter means 204, in which the signal is converted from analogue to digital form. The digital signal propagates to pre-processing means 206, in which, for example, the signal can be filtered, DC-offset can be removed from the signal, automatic gain of the digital signal can be controlled, and the signal can be demodulated. From the pre-processing means 206, the signal is supplied to means 208, in which the impulse response of the channel and its energy are estimated. From the pre-processing means 206, the signal is also supplied to a filter 212 matched to the channel, and to the filter is also supplied the impulse response estimated in means 208. The matched filter 212 restores the signal distorted in the channel to the original data stream with a symbol error probability depending on interference caused, for example, by adjacent received bits. From the impulse response data are formed, for example, autocorrelation taps of the estimated impulse response of the channel, using means 210. The above facilities can be implemented, for example, by general or signal processors, or by separate logic.

Figure 3:
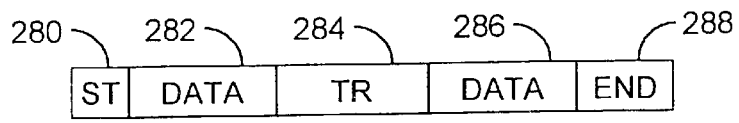
FIG. 3 illustrates the structure of a normal burst in a GSM system.

In digital systems, a predefined symbol sequence can be placed in signal bursts, and on the basis of the sequence, the impulse response, for example, can be computed. FIG. 3 shows, by way of an example, a burst of a digital GSM cellular radio system. A normal burst in the GSM system comprises 148 symbols in all. The symbols comprise bits or bit combinations. The symbols of a burst are in sequences that comprise 3 start symbols 280, 58 data symbols 282, 26 training symbols 284, 58 data symbols 286, and 3 end symbols 288. The length of a training sequence in a normal burst of the GSM is thus 26 symbols, which can have the value −1 or 1.

In a receiver according to the invention, a quantity—which can be called signal-to-noise ratio-proportional to signal quality is formed on the basis of the output signal of the matched filter 212 and the training sequence contained in the signal. In the solution of the invention, a result vector of the length of the training sequence is first formed from the symbols of the output signal of the matched filter and from the corresponding symbols of the training sequence in computation means 214, which can be preferably implemented e.g. by general or signal processors or by separate logic.

In a first preferred embodiment of the invention, the result vector is formed by multiplying the symbols of the output signal of the matched filter by the corresponding symbols of the training sequence. The method can be described by the formula REF(i)=MF(i+offset)*Tr(i)

in which MF stands for the output signal of the matched filter, i is an index from zero preferably up to the length of the training sequence, i.e. in the GSM, up to 26, offset is a deflection index by which the index can be made to point to the first bit of the training sequence, and Tr is a bit of the training sequence. The maximum value of index i can also be smaller than the length of the training sequence. The result, however, is then worse.

Each term of the result vector REF now has the same sign. A mean value $REF_{mean}$ and variance $REF_{var}$ are next computed for the result vector in the computation means, e.g. by the formulae $$REF_{mean} = \sum_{i=0}^{L-1} \frac{REF(i)}{L} \quad \text{and}$$

$$REF_{var} = \sum_{i=0}^{L-1} \frac{(REF(i) - REF_{mean})^2}{L}$$

where L is the length of the result vector, i.e. at most the length of the training sequence, i.e. in the GSM example L=26.

The quantity proportional to signal quality is formed in means 214 as a quotient of the squared mean value of the result vector and the variance of the result vector, i.e.

$$W = K * \frac{(REF_{mean})^2}{REF_{var}},$$

where K is a constant coefficient that can be selected specifically for each application. The resultant quantity 218 describing signal quality is forwarded, with the autocorrelation tap coefficients 216, to the other parts of the receiver.

In a second preferred embodiment of the invention, the effect of adjacent received bits, i.e. Intersymbol Interference ISI, is taken into account in the computation of the result vector. To achieve this, the autocorrelation tap coefficients of the impulse response computed in means 210 are taken into account in the computation of the result vector.

In a digital system, the impulse response of a channel is described generally by an N-symbol figure. In the GSM system, for example, the impulse response of the channel comprises 5 symbols, i.e. N is 5. The number N of the autocorrelation taps of the impulse response in the GSM system is thus 5.

In the second preferred embodiment of the invention, the result vector is formed by subtracting from each symbol of the output signal of the matched filter N−1 symbols preceding and N−1 symbols following the corresponding symbol of the known training sequence, the symbols being multiplied by the corresponding tap coefficients of the autocorrelation function. The effect of adjacent bits can thus be eliminated. The method is illustrated in the GSM system by the formula REF(4+i)=MF(4+i+offset)*Tr(i+3)

−Tr(i+3)*c(1)

−Tr(i+2)*c(2)

−Tr(i+1)*c(3)

−Tr(i)*c(4)

−Tr(i+5)*c(1)

−Tr(i+6)*c(2)

−Tr(i+7)*c(3)

−Tr(i+8)*c(4), where c(j) stand for the autocorrelation taps of the impulse response, j=[0, . . . ,4], c(o) stands for the energy of the bit and the other indexes stand for the effect of adjacent bits. In other words, if—like in the GSM system—the impulse response is five bits in length, then the four preceding and the four following samples affect each output bit of the matched filter in accordance with the corresponding autocorrelation tap. By the method, interference can be eliminated.

The computed quantity describing the signal quality can be used particularly in a diversity receiver when signals from various diversity branches are combined. As stated above, when maximal ratio combination is used, the signals to be combined are multiplied by a weighting coefficient before the combination. Preferably, the quantity describing the signal quality computed in accordance with the invention can be used as a weighting coefficient, whereby a good combination result will be achieved.

Figure 4:
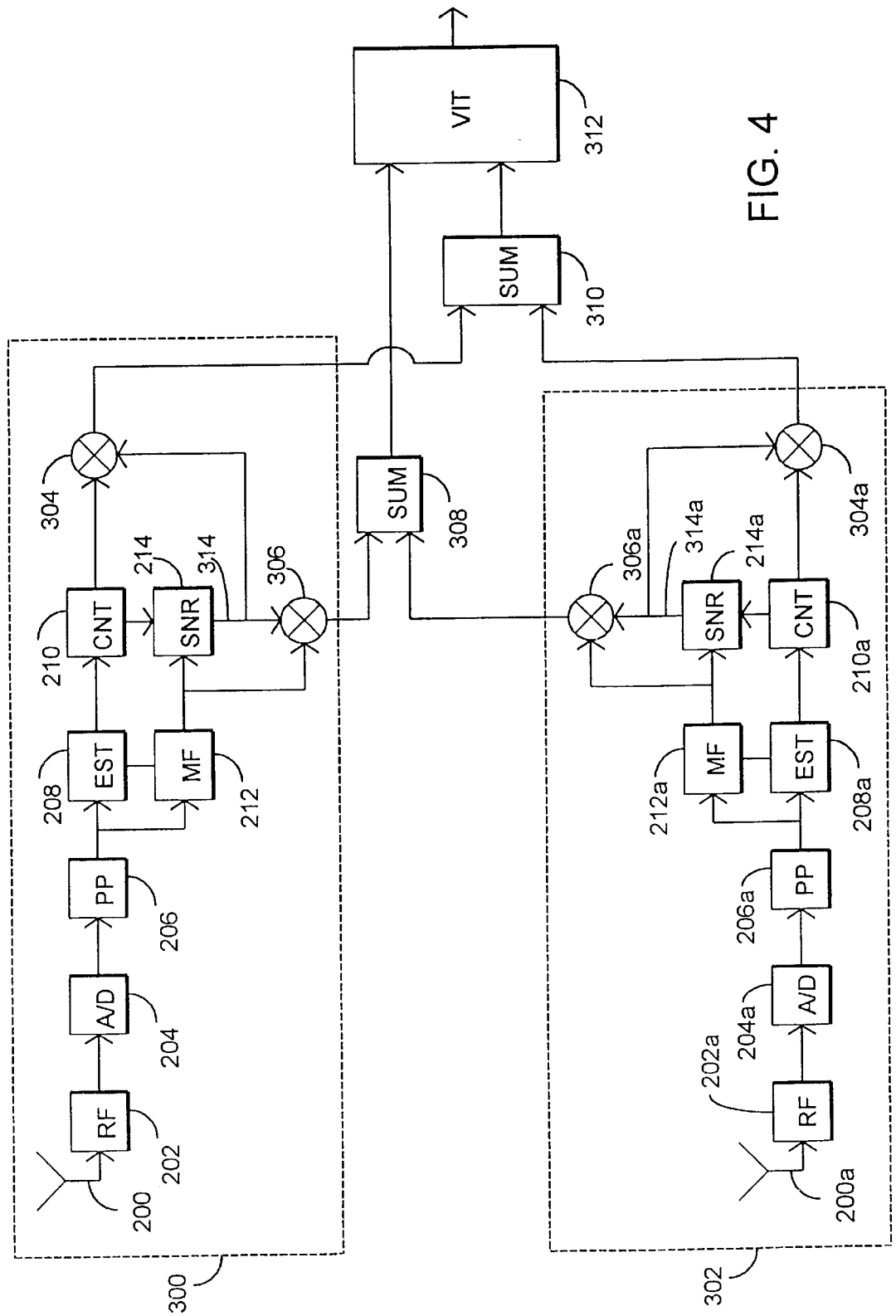
FIG. 4 illustrates an exemplary structure of a diversity receiver according to the invention.

In the following we shall study the structure of a diversity receiver according to the invention in greater detail, the essential parts of the structure being shown in the block diagram of FIG. 4. The receiver comprises, by way of an example, two diversity branches 300, 302. The number of branches in an actual receiver may naturally also be different. The structure of each diversity branch is similar to the structure of a receiver described above, i.e. a branch comprises an antenna 200, 200a; radio frequency means 202, 202a; an analogue/digital converter 204, 204a; preprocessing means 206, 206a operating as described above; a matched filter 212, 212a; estimation means 208, 208a for estimating the impulse response; computation means 210, 210a for computing the tap coefficients of the autocorrelation function of the impulse response; and means 214, 214a according to the invention for computing the quantity describing the signal quality. The receiver further comprises detection means 312, which can preferably be implemented e.g. by a Viterbi technique.

The receiver further comprises summing means 310 for combining the computed autocorrelation taps of the different diversity branches before the detection, and means 308 for combining the output signals of the matched filters 212, 212a of the diversity branches before the detection.

In a receiver according to the invention, the signals to be combined are weighted in each branch—before the combination—by a quantity 314, 314a describing the signal quality, computed by the method of the invention. The tap coefficients of the autocorrelation function are weighted in summers 304, 304a, and the output signals of the matched filters are weighted in summers 306, 306a.

Although the invention is described above with reference to the example illustrated in the attached drawings, it is to be understood that the invention is not limited thereto but can be varied in many ways within the scope of the inventive idea disclosed in the attached claims.

What is claimed is:

1. A method for estimating the quality of a connection in a digital radio system in which the signals transmitted include bursts consisting of symbols and including a known training sequence, and in which method a received signal is processed by a matched filter, and in which an impulse response and N tap coefficients of the autocorrelation function of the impulse response are computed for the received signal, N being the number of bits in the impulse response, the method comprising:

forming a result vector of the length of the training sequence from the symbols of the output signal of the matched filter and the corresponding symbols of the known training sequence, modifying the obtained result vector using the autocorrelation tap coefficients, computing a mean value and variance for the symbols of the result vector, and forming a quantity proportional to signal quality as a quotient of the squared mean value of the result vector and the variance of the result vector.

2. A method for combining diversity signals in a digital radio system in which the signals transmitted include bursts consisting of symbols and including a known training sequence, and in which method a received signal is processed by a matched filter, and in which an impulse response and N tap coefficients of the autocorrelation function of the impulse response are computed for the received signal, N being the number of bits in the impulse response, and the received diversity signals are combined by maximal ratio combination before detection, the signals being weighted, before the combination, by a coefficient proportional to signal quality, the method comprising:

forming a result vector of the length of the training sequence from the symbols of the output signal of the matched filter and the corresponding symbols of the known training sequence, and that the obtained result vector is modified using the autocorrelation tap coefficients, computing a mean value and variance for the symbols of the result vector, and forming a quantity proportional to signal quality as a quotient of the squared mean value of the result vector and the variance of the result vector.

3. The method according to claim 1, further comprising forming the result vector by multiplying the symbols of the output signal of the matched filter by the corresponding symbols of the known training sequence.

4. The method according to claim 3, further comprising computing an impulse response and N tap coefficients of the autocorrelation function of the impulse response for the received signal, N being the number of bits in the impulse response, and that when the result vector is formed, from each symbol of the output signal of the matched filter multiplied by the corresponding symbol of the training sequence are subtracted N−1 symbols preceding and N−1 symbols following the corresponding symbol of the known training sequence, said symbols being multiplied by the corresponding tap coefficients of the autocorrelation function.

5. A receiver in a digital radio system in which the signals transmitted comprise bursts consisting of symbols and comprising a known training sequence, the receiver comprising a filter (212, 212a) matched to the received signal and means (208, 208a) for computing an impulse response for the received signal, and means (210, 210a) for computing N tap coefficients of the autocorrelation function of the impulse response, N being the number of bits in the impulse response, characterized in that the receiver comprises means (214, 214a) for forming a result vector of at most the length of the training sequence from the symbols of the output signal of the matched filter (212, 212a) and the corresponding symbols of the known training sequence, means (214, 214a) for modifying the result vector using the autocorrelation tap coefficients, means (214, 214a) for computing a mean value and variance for the symbols of the result vector, and means (214, 214a) for forming a quantity proportional to signal quality as a quotient of the squared mean value of the result vector and the variance of the result vector.

6. A receiver according to claim 5, characterized in that the receiver comprises means (214, 214a) for forming the result vector by multiplying the symbols of the output signal of the matched filter (212, 212*a*) by the corresponding symbols of the known training sequence.

7. A receiver according to claim 6, characterized in that the receiver comprises means for computing an impulse response (208, 208*a*) for the received signal, and means (210, 210*a*) for computing N tap coefficients of the autocorrelation function of the impulse response, N being the number of bits in the impulse response, and means (214, 214*a*) for forming the result vector by subtracting from each symbol of the output signal of the matched filter (212, 212*a*) multiplied by the corresponding symbol of the training sequence N−1 symbols preceding and N−1 symbols following the corresponding symbol of the training sequence, the symbols being multiplied by the corresponding tap coefficients of the autocorrelation function.

8. A receiver according to claim 6, characterized in that the receiver comprises at least two diversity branches (300, 302); detection means (312); means (308 and 310) for combining the diversity branches, said means being located before the detection means (312) and combining the symbols of different branches that correspond to one another with respect to time; and that the receiver comprises means (304, 304*a*, 308, 308*a*) for weighting the outputs of the matched filters (212, 212*a*) of each branch and the autocorrelation taps of the impulse response by a quantity, specific for each branch, proportional to signal quality.

9. The method according to claim 2, further comprising forming the result vector by multiplying the symbols of the output signal of the matched filter by the corresponding symbols of the known training sequence.

10. The method according to claim 9, further comprising computing an impulse response and N tap coefficients of the autocorrelation function of the impulse response for the received signal, N being the number of bits in the impulse response, and that when the result vector is formed, from each symbol of the output signal of the matched filter multiplied by the corresponding symbol of the training sequence are subtracted N−1 symbols preceding and N−1 symbols following the corresponding symbol of the known training sequence, said symbols being multiplied by the corresponding tap coefficients of the autocorrelation function.

11. A receiver according to claim 7, characterized in that the receiver comprises at least two diversity branches (300, 302); detection means (312); means (308 and 310) for combining the diversity branches, said means being located before the detection means (312) and combining the symbols of different branches that correspond to one another with respect to time; and that the receiver comprises means (304, 304*a*, 308, 308*a*) for weighting the outputs of the matched filters (212, 212*a*) of each branch and the autocorrelation taps of the impulse response by a quantity, specific for each branch, proportional to signal quality.

* * * * *